(12) United States Patent
Herzig et al.

(10) Patent No.: US 11,188,809 B2
(45) Date of Patent: Nov. 30, 2021

(54) OPTIMIZING PERSONALITY TRAITS OF VIRTUAL AGENTS

(71) Applicant: INTERNATIONAL BUSINESS MACHINES CORPORATION, Armonk, NY (US)

(72) Inventors: Jonathan Herzig, Tel Aviv (IL); David Konopnicki, Haifa (IL); Michal Shmueli-Scheuer, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 15/634,496

(22) Filed: Jun. 27, 2017

(65) Prior Publication Data
US 2018/0374000 A1    Dec. 27, 2018

(51) Int. Cl.
| G06N 3/00 | (2006.01) |
| G06N 5/04 | (2006.01) |
| G06Q 30/00 | (2012.01) |
| G06N 20/00 | (2019.01) |
| G06N 5/00 | (2006.01) |
| G06N 5/02 | (2006.01) |
| G06Q 30/06 | (2012.01) |

(52) U.S. Cl.
CPC ............ *G06N 3/006* (2013.01); *G06N 5/003* (2013.01); *G06N 5/02* (2013.01); *G06N 5/04* (2013.01); *G06N 20/00* (2019.01); *G06Q 30/016* (2013.01); *G06Q 30/0601* (2013.01)

(58) Field of Classification Search
CPC ........ G06N 20/00; G06N 3/006; G06N 5/003; G06N 5/04; G06N 99/005; G06Q 30/016; G06Q 30/0601

USPC .......................................................... 706/12
See application file for complete search history.

(56) References Cited

U.S. PATENT DOCUMENTS

| 6,389,400 B1 | 5/2002 | Bushey et al. |
| 7,158,628 B2 | 1/2007 | McConnell et al. |
| (Continued) | | |

FOREIGN PATENT DOCUMENTS

WO    2015134767 A1    9/2015

OTHER PUBLICATIONS

Zhang et al., "Modeling Personality, Mood, and Emotions" 2016, Chapter 10 of "Context Aware Human-Robot and Human-Agent Interaction", pp. 212-236. (Year: 2016).*

(Continued)

*Primary Examiner* — Miranda M Huang
*Assistant Examiner* — Chase P. Hinckley
(74) *Attorney, Agent, or Firm* — John Noh

(57) ABSTRACT

A method, computer system, and a computer program product for optimizing a plurality of personality traits of a virtual agent based on a predicted customer satisfaction value is provided. The present invention may include identifying a customer. The present invention may also include retrieving a plurality of data associated with the customer. The present invention may then include analyzing the received plurality of data using a customer satisfaction prediction model. The present invention may further include generating a plurality of analyzed data from the customer satisfaction prediction model based on the analyzed plurality of data. The present invention may also include generating a plurality of personality traits for a virtual agent from the generated plurality of analyzed data.

20 Claims, 6 Drawing Sheets

(56) References Cited

U.S. PATENT DOCUMENTS

| | | | | |
|---|---|---|---|---|
| 8,156,060 | B2* | 4/2012 | Borzestowski | G06F 16/3332 706/45 |
| 8,630,961 | B2* | 1/2014 | Beilby | G06N 3/004 706/11 |
| 9,213,940 | B2* | 12/2015 | Beilby | G06N 3/004 |
| 9,491,295 | B2 | 11/2016 | Shaffer et al. | |
| 9,761,222 | B1* | 9/2017 | Scarasso | G10L 15/07 |
| 9,812,151 | B1* | 11/2017 | Amini | G10L 15/26 |
| 9,847,084 | B2* | 12/2017 | Gustafson | G10L 15/19 |
| 9,922,649 | B1* | 3/2018 | LoRe | G06Q 30/016 |
| 10,007,918 | B1* | 6/2018 | Cox | G06Q 30/016 |
| 10,051,122 | B2* | 8/2018 | Raanani | G06N 7/005 |
| 10,362,219 | B2* | 7/2019 | Wilson | G06F 3/048 |
| 2010/0020959 | A1 | 1/2010 | Spottiswoode | |
| 2012/0130771 | A1* | 5/2012 | Kannan | G06Q 10/06393 705/7.32 |
| 2012/0284080 | A1* | 11/2012 | De Oliveira | G06Q 30/0202 705/7.29 |
| 2014/0114886 | A1* | 4/2014 | Mays | G06F 9/453 706/12 |
| 2014/0201125 | A1* | 7/2014 | Moeinifar | G06N 5/02 706/47 |
| 2014/0310001 | A1* | 10/2014 | Kalns | G10L 15/32 704/270.1 |
| 2014/0317030 | A1* | 10/2014 | Shen | G06Q 30/01 706/12 |
| 2015/0134325 | A1* | 5/2015 | Skiba | G06F 40/30 704/9 |
| 2015/0170042 | A1* | 6/2015 | Perkowitz | H04W 4/21 706/11 |
| 2015/0242707 | A1* | 8/2015 | Wilf | G06K 9/6256 382/159 |
| 2015/0254675 | A1* | 9/2015 | Kannan | G06Q 30/02 705/304 |
| 2015/0312417 | A1 | 10/2015 | Conway et al. | |
| 2015/0358416 | A1* | 12/2015 | Gariepy | G06Q 50/01 709/206 |
| 2016/0042359 | A1* | 2/2016 | Singh | G06F 40/58 704/2 |
| 2016/0118050 | A1* | 4/2016 | Arslan | G10L 25/63 704/235 |
| 2016/0154948 | A1* | 6/2016 | Guo | G16H 40/63 705/2 |
| 2016/0163332 | A1* | 6/2016 | Un | G06F 16/90332 704/260 |
| 2016/0227035 | A1* | 8/2016 | Kumar | G06F 21/32 |
| 2016/0300570 | A1* | 10/2016 | Gustafson | G10L 25/51 |
| 2016/0342911 | A1* | 11/2016 | Kannan | G06Q 30/01 |
| 2017/0032270 | A1* | 2/2017 | Lee | G06N 7/005 |
| 2017/0061316 | A1* | 3/2017 | Tur | G06F 9/453 |
| 2017/0069340 | A1* | 3/2017 | Nowson | G06F 40/30 |
| 2017/0111507 | A1* | 4/2017 | McGann | G06N 5/04 |
| 2017/0111508 | A1* | 4/2017 | Sharpe | H04M 3/5233 |
| 2017/0187880 | A1* | 6/2017 | Raanani | H04M 3/5191 |
| 2017/0206095 | A1* | 7/2017 | Gibbs | G06F 3/011 |
| 2017/0208177 | A1* | 7/2017 | Conway | H04M 3/523 |
| 2017/0264744 | A1* | 9/2017 | Conway | H04L 67/10 |
| 2017/0270416 | A1* | 9/2017 | Sri | G06N 20/00 |
| 2017/0277993 | A1* | 9/2017 | Beaver | G06F 40/40 |
| 2017/0324866 | A1* | 11/2017 | Segre | H04L 51/046 |
| 2017/0344889 | A1* | 11/2017 | Sengupta | H04L 67/22 |
| 2018/0052664 | A1* | 2/2018 | Zhang | G06F 16/90332 |
| 2018/0091654 | A1* | 3/2018 | Miller | H04M 3/42221 |
| 2018/0114527 | A1* | 4/2018 | Zilotti | H04M 3/527 |
| 2018/0114528 | A1* | 4/2018 | Yasavur | G10L 15/1815 |
| 2018/0159977 | A1* | 6/2018 | Danson | H04M 3/5232 |
| 2018/0165596 | A1* | 6/2018 | Abrams | G06N 5/04 |
| 2018/0211260 | A1* | 7/2018 | Zhang | G06N 20/00 |
| 2018/0341903 | A1* | 11/2018 | Keen | G06Q 10/063118 |
| 2018/0366118 | A1* | 12/2018 | Lovitt | G06F 16/90332 |
| 2018/0367480 | A1* | 12/2018 | Housman | G06F 40/216 |
| 2019/0109803 | A1* | 4/2019 | Akkiraju | H04M 3/51 |
| 2019/0238487 | A1* | 8/2019 | Ciano | G06F 40/30 |
| 2019/0251859 | A1* | 8/2019 | Xu | G06Q 30/016 |

OTHER PUBLICATIONS

Liu et al., "A fast-training approach using ELM for Satisfaction Analysis of Call Centers" Jan. 13-16, 2017, pp. 143-147. (Year: 2017).*

Boulic et al., "Towards the Instantaneous Expression of Emotions with Avatars" 2017, Chapter 13 of "Cyberemotions" pp. 255-278. (Year: 2017).*

Xu et al., "Understanding the impact of personality traits on mobile app adoption—Insights from a large-scale field study" Apr. 8, 2016, Computers in Human Behavior, No. 62, pp. 244-256. (Year: 2016).*

Ask et al., "The State of Chatbots" Oct. 20, 2016, Forrester, pp. 1-15. (Year: 2016).*

Das et al., "Visual Dialog" Apr. 24, 2017, pp. 1-23. (Year: 2017).*

Hori et al., "End-to-End Conversation Modeling Track in DSTC6" Jun. 22, 2017, pp. 1-6. (Year: 2017).*

Trescak et al., "Personalities, Physiology, Institutions, and Genetics: Simulating Ancient Societies with Intelligent Virtual Agents" Oct. 21, 2016, pp. 377-404. (Year: 2016).*

Bogdanovych et al., "What makes virtual agents believable?" Feb. 3, 2016, pp. 83-108. (Year: 2016).*

Durupinar et al., "PERFORM: Perceptual Approach for Adding OCEAN Personality to Human Motion Using Laban Movement Analysis" Oct. 2016, pp. 1-16. (Year: 2016).*

Liu et al., "Two Techniques for Assessing Virtual Agent Personality" Jan. 2016, pp. 94-105. (Year: 2016).*

Alameda-Pineda et al., "SALSA: A Novel Dataset for Multimodal Group Behavior Analysis" Aug. 2016, pp. 1707-1720. (Year: 2016).*

Wu et al., "Sequential Matching Network: A New Architecture for Multi-turn Response Selection in Retrieval-Based Chatbots" May 15, 2017. (Year: 2017).*

Tatai et al., "The Chatbot Who Loved Me" May 2003. (Year: 2003).*

Verhagen et al., "Customer Service Agents: Using Social Presence and Personalization to Shape Online Service Encounters" 2014, pp. 1-17. (Year: 2014).*

D'silva et al., "Real World Smart Chatbot for Customer Care using a Software as a Service (SAAS) Architecture" Feb. 10, 2017, pp. 658-664. (Year: 2017).*

Fung et al., "Towards Empathetic Human-Robot Interactions" May 13, 2016, (Year: 2016).*

Xianyu et al., "Heterogeneity-Entropy Based Unsupervised Feature Learning for Personality Prediction with Cross-Media Data" Jul. 11, 2016. (Year: 2016).*

Lin et al., "A Web-based Platform for Collection of Human-Chatbot Interactions" Oct. 2016, pp. 363-366. (Year: 2016).*

Zhang et al., "Deep Bimodal Regression for Apparent Personality Analysis" Oct. 8, 2016, pp. 311-324. (Year: 2016).*

Yueh et al., "A Virtual Travel Agent System for M-Tourism with Semantic Web Service Based Design and Implementation" 2007. (Year: 2007).*

Suwajanakorn et al., "What Makes Tom Hanks Look Like Tom Hanks" 2015, pp. 3952-3960. (Year: 2015).*

Tanaka et al., "Teaching Social Communication Skills Through Human-Agent Interaction" 2016, pp. 1-26. (Year: 2016).*

Escalante et al., "Design of an Explainable Machine Learning Challenge for Video Interviews" May 14, 2017, pp. 3688-3695. (Year: 2017).*

Miranda-Correa et al., "AMIGOS: A Dataset for Affect, Personality, and Mood Research on Individuals and Groups" Apr. 13, 2017, pp. 1-14. (Year: 2017).*

Lee et al., "The ChatBot Feels You—A Counseling Service Using Emotional Response Generation" Feb. 13, 2017, pp. 437-440. (Year: 2017).*

Castries, Jerome de la Croix "Using artificial intelligence to enhance personalization of customer relationship management in the contact center space: Afiniti's technology case study" Jun. 20, 2017, pp. 1-62. (Year: 2017).*

(56) References Cited

OTHER PUBLICATIONS

Islam et Rahman, "Personality factors as predictors of online consumer engagement: an empirical investigation" May 6, 2017. (Year: 2017).*
Castillo, Javier, "The relationship between big five personality traits, customer empowerment, and customer satisfaction in the retail industry" Jan. 2017. (Year: 2017).*
Diaz-Aviles et al., "Towards Real-time Customer Experience Prediction for Telecommunication Operators" Sep. 24, 2015. (Year: 2015).*
Monsted et al., "Phone-based Metric as a Predictor for Basic Personality Traits" Apr. 16, 2016, pp. 1-9. (Year: 2016).*
Oraby et al., "'How May I Help You?': Modeling Twitter Customer Service Conversations Using Fine-Grained Dialogue Acts" Mar. 13-16, 2017, pp. 343-355. (Year: 2017).*
Salam et al., "Fully Automatic Analysis of Engagement and Its Relationship to Personality in Human-Robot Interactions" Mar. 6, 2017, pp. 705-721. (Year: 2017).*
Gucluturk et al., "Deep Impression: Audiovisual Deep Residual Networks for Multimodal Apparent Personality Trait Recognition" Sep. 16, 2016, pp. 1-10. (Year: 2016).*
Anonymous, "A Method for Improving Overall Delivery Atmosphere in Self-Help Contact Centers in Virtual Worlds," An IP.com Prior Art Database Technical Disclosure, May 18, 2010, p. 1-2, IP.com No. IPCOM000195822D.
Herzig et al., "Predicting Customer Satisfaction in Customer Support Conversations in Social Media Using Affective Features," Proceedings of the 2016 Conference on User Modeling Adaptation and Personalization (UMAP '16), Jul. 13-17, 2016, p. 115-119, ACM, Halifax, NS, Canada.
Lee et al., "Evolutionary Multi-Objective Optimization for Generating Artificial Creature's Personality," IEEE Congress an Evolutionary Computation (CEC 2007), 2007, p. 2450-2455, IEEE.
Mairesse et al., "Towards Personality-Based User Adaptation: Psychologically Informed Stylistic Language Generation," User Modeling and User-Adapted Interaction, Aug. 2010, p. 227-278, vol. 20, Issue 3, Springer Science+Business Media B.V.
Mell et al., "The NIST Definition of Cloud Computing," National Institute of Standards and Technology, Sep. 2011, p. 1-3, Special Publication 800-145.
Sarb et al., "The Perfect Match: Using Behavioral Analytics and Predictive Modeling to Pair Callers with the Best-Suited Service Representative," ICMI Resources, May 2, 2013, p. 1, UBM, http://www.icmi.com/Resources/Technology/2013/05/The-Perfect-Match-Using-Behavioral-Analytics-and-Predictive-Modeling, Accessed on Apr. 20, 2017.
Zendesk, "Zendesk Brings Sixth Sense to Customer Conversations," Zendesk Press Releases, Oct. 7, 2015, p. 1-2, Zendesk, Inc., https://www.zendesk.com/company/press/zendesk-brings-sixth-sense-customer-conversations/, Accessed on Apr. 20, 2017.

* cited by examiner

--PRIOR ART--

--PRIOR ART--

OPTIMIZING PERSONALITY TRAITS OF VIRTUAL AGENTS

BACKGROUND

The present invention relates generally to the field of computing, and more particularly to cognitive computing.

The use of virtual agents (i.e., chatbots) to provide customer support service has rapidly increased in popularity. In these interactions, virtual agents communicate directly to customers through social media channels. Even during the early stages of the interaction, the personality traits of the virtual agent affect the customer satisfaction with a company, product, service or social media channel.

SUMMARY

Embodiments of the present invention disclose a method, computer system, and a computer program product for optimizing a plurality of personality traits of a virtual agent based on a predicted customer satisfaction value. The present invention may include identifying a customer. The present invention may also include retrieving a plurality of data associated with the customer. The present invention may then include analyzing the received plurality of data using a customer satisfaction prediction model. The present invention may further include generating a plurality of analyzed data from the customer satisfaction prediction model based on the analyzed plurality of data. The present invention may also include generating a plurality of personality traits for a virtual agent from the generated plurality of analyzed data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
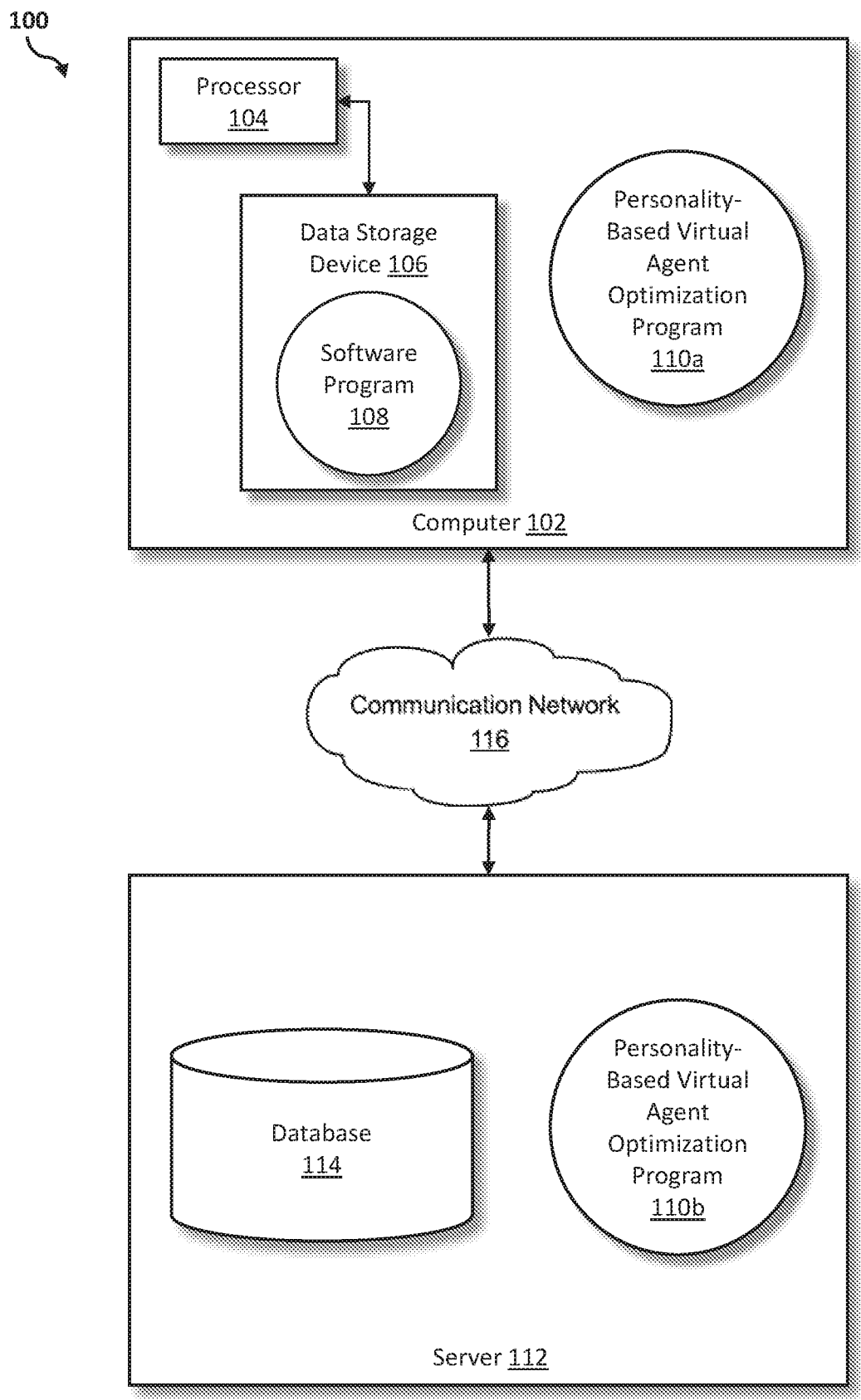
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for optimizing the personality trait levels of virtual agents based on customer satisfaction. As such, the present embodiment has the capacity to improve the technical field of cognitive computing by determining the optimal levels for the personality traits of a virtual agent to maximize customer satisfaction. More specifically, the personality-based virtual agent optimization program may identify the customer and retrieve data from social media dialogs and other communications with the customer that occurred in the past and during the current interaction between the customer and the virtual agent. The retrieved data may be analyzed by a previously trained customer satisfaction prediction model to determine the optimal personality traits of a virtual agent to maximize customer satisfaction. In addition, the customer satisfaction prediction model may utilize a known external extraction engine to extract the personality traits of the customer based on the various forms of communication (e.g., text, emotions, speech and facial expressions) exhibited from the retrieved data on the customer. Constraints are then applied to determine the personality traits of the optimal virtual agent based on the retrieved data on the customer. The customer satisfaction prediction model and the generated data (e.g., constraints on personality traits for the optimal virtual agent and personality traits of the customer) may be utilized to determine the personality traits for the optimal virtual agent to maximize the satisfaction of the customer.

As described previously, the use of virtual agents (i.e., chatbots) to provide customer support service has rapidly increased in popularity. In these interactions, virtual agents communicate directly to customers through social media channels. Even during the early stages of an interaction, the personality traits of the virtual agent affect the customer satisfaction with a company, product, service or social media channel.

Therefore, it may be advantageous to, among other things, determine the optimal levels for the personality traits of a virtual agent to compliment the personality traits of a given customer to maximize customer satisfaction for the given customer. Since customer satisfaction is affected by the personality traits of the customer and of the agent, changing the personality traits of the agent may change the customer satisfaction.

According to at least one embodiment, the personality-based virtual agent optimization program may change the personality traits of a virtual agent until the maximum customer satisfaction is reached. The personality-based virtual agent optimization program may receive data on a given customer to determine the optimal personality traits of a virtual agent. The received data may be entered into a previously trained customer satisfaction prediction model, and then a constrained optimization solver, which determines the optimal personality traits of the agent by changing the personality traits of the virtual agent.

According to at least one embodiment, the personality-based virtual agent optimization program may generate data representing the personality traits of the agent to create a customized (i.e., optimal) virtual agent to maximize customer satisfaction for a specific interaction. As such, the assignment of a virtual agent may be conditional on the optimal personality traits that may be expressed to continue a virtual chat with the customer and to maximize customer satisfaction. However, before an optimized virtual agent may be assigned to a customer to continue the virtual chat, the initial virtual agent may receive parameters for the virtual chat, and the personality trait values of the customer may be analyzed to determine the maximum customer satisfaction.

According to at least one embodiment, a machine learning model (e.g., customer satisfaction prediction model) may be a function that is utilized to predict the probability for a dialog to end with a positive customer satisfaction result between the virtual agent and the specific customer. The customer satisfaction prediction model, which uses dialogs tagged with a binary label from different customers and agents, may indicate whether the dialog ended with a positive customer satisfaction result or not. The personality traits for the customer and the virtual agent may be calculated from historical social media activity and other forms of previous communication. The values of the personality trait levels of the specific customer and the virtual agent may be used as arguments by the customer satisfaction prediction model. Additionally, the customer satisfaction prediction model may have parameters that are random before training. During the training process, the parameters may be learned in order for the function of the customer satisfaction prediction model to utilize these learned parameters after training has been completed.

According to at least one embodiment, the customer satisfaction prediction model may extract features related to personality traits, emotions (i.e., emotion expressed in the content of the data) and the text (i.e., extracted from content of the data) from the previous interactions. The extracted features and the customer satisfaction score may be dependent on the personality traits of the agent expressed in previous interactions. The customer satisfaction prediction model may be further utilized to determine the optimal personality traits of the virtual agent in future interactions. The customer satisfaction model, after training, may be a function that receives personality traits for the customer and the virtual agent, in addition to other features, and outputs a prediction for customer satisfaction. The function may be optimized to determine the optimal agent personality traits.

The present embodiment may include determining the personality trait levels of the virtual agent using the customer satisfaction prediction model to predict the customer satisfaction. Customer satisfaction is determined by associating conversations with a label. The label may indicate whether the customer is satisfied or dissatisfied with the customer-virtual agent interaction. The labels may be utilized as training data for the customer satisfaction prediction model. To train (i.e., build) the customer satisfaction prediction model, examples of conversations with corresponding labels (i.e., whether the conversations ended with positive customer satisfaction or not) may be included. According to at least one other embodiment, the label and extracted features (including the personality traits of the customer) from each interaction may be utilized to generate a default virtual agent for the customer. The generated default virtual agent, however, may exclude the optimal levels for maximizing the customer satisfaction. Instead, the generated default virtual agent may be a default virtual agent and not an optimal virtual agent to best match the personality traits of the customer. To utilize the generated default virtual agent in the personality-based virtual agent optimization program, minimal constraints may be applied on the personality trait values of the generated default virtual agent.

According to at least one embodiment, the personality traits of the agent and customer may be determined prior to the training of the customer satisfaction prediction model. As such, the personality-based virtual agent optimization program may select a specific range or type of personality traits for the virtual agent. The personality traits, for example, may include the commonly accepted Big Five traits: Agreeableness (e.g., altruism, cooperation, modesty, uncompromising, sympathy and trust); Conscientiousness (e.g., achievement striving, cautiousness, dutifulness, orderliness, self-discipline and self-efficacy); Extraversion (e.g., activity level, assertiveness, cheerfulness, excitement-seeking, outgoing and gregariousness); Neuroticism (e.g., fiery, prone to worry, melancholy, immoderation, self-conscientiousness and susceptible to stress); and Openness (e.g., adventurous, artistic interests, emotionality, imagination, intellectual and authority-challenging). In the present embodiment, the personality-based virtual agent optimization program may include additional or different personality traits for the range of personality traits of the agent and customer.

According to at least one embodiment, an optional list of equality and inequality constraints may be utilized to determine the personality trait values for an acceptable virtual agent. Since a full spectrum of personality traits for the virtual agent may not maximize customer satisfaction, constraints may be applied to include a specific range of a personality trait or a sum of the personality traits that the optimal virtual agent may possess. These constraints may include upper and lower bounds for each personality trait (e.g., the [0,1] range, or some tighter bound), and other constraints on the overall distribution of traits may be set (e.g., limiting the sum of all traits).

The present embodiment may include an optimal set of personality trait values that the optimal virtual agent for a specific customer may possess to maximize customer satisfaction given the set of constraints and personality traits of the customer. The constrained optimization solver may utilize a known algorithm to determine the personality traits for the optimal agent. According to at least one embodiment, the optimization may be performed per customer, and the computed personality trait levels of the optimal virtual agent may be personalized for each customer.

The present embodiment may be integrated into a previously existing software application for generating a virtual agent to assist a customer via virtual chat. According to at least one other embodiment, the personality-based virtual agent optimization program may also be a separate program, apart from another software application for virtual agent generation or virtual chart assistance.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a personality-based virtual agent optimization program 110a. The networked computer environment 100 may also include a server 112 that is enabled to run a personality-based virtual agent optimization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the personality-based virtual agent optimization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the personality-based virtual agent optimization program 110a, 110b (respectively) to optimize the personality trait levels of virtual agents based on predicted customer satisfaction. The personality-based virtual agent optimization method is explained in more detail below with respect to FIGS. 2 and 3.

Figure 2:
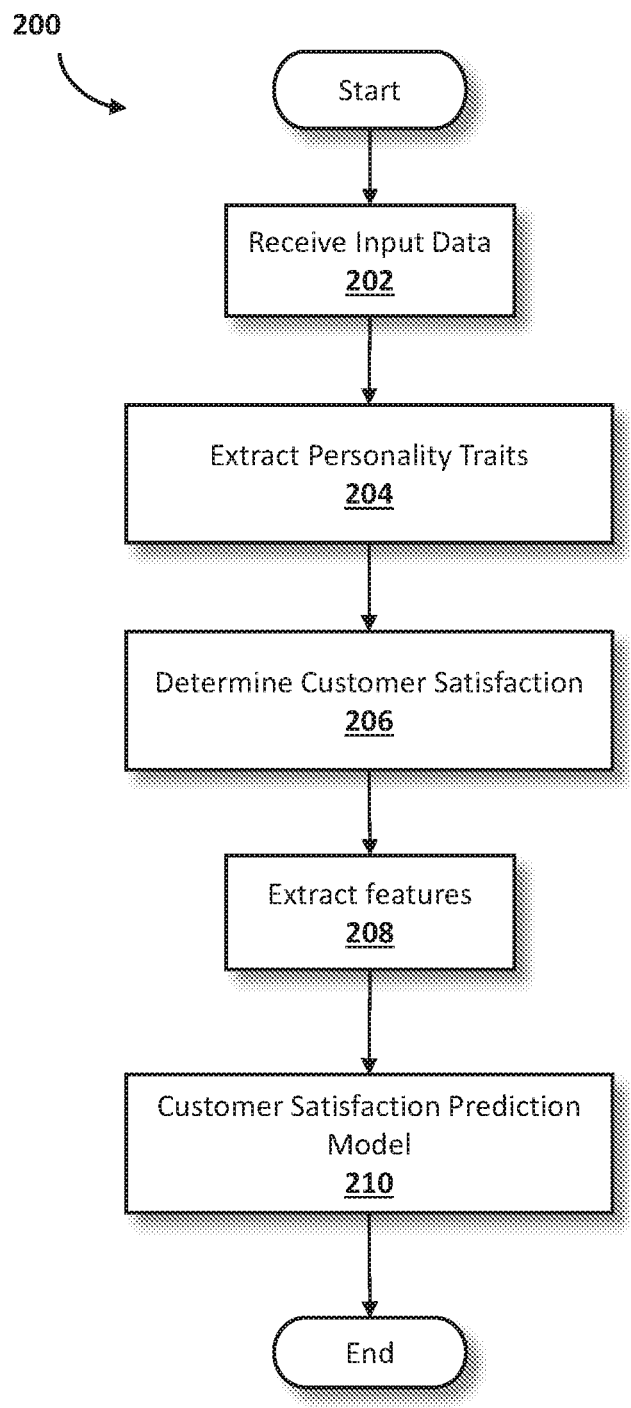
FIG. 2 is an operational flowchart illustrating a process for building the customer satisfaction prediction model according to at least one embodiment.

Referring now to FIG. 2, an operational flowchart illustrating the exemplary customer satisfaction prediction building process 200 used by the personality-based virtual agent optimization program 110a and 110b according to at least one embodiment is depicted.

At 202, input data is received. Input data may be utilized to build the customer satisfaction prediction model. Input data may include social media conversations (e.g., historical dialogs and previous social media interactions) between a customer and virtual agent, and other written communication (e.g., emails and questionnaires) generated by the customer. The personality-based virtual agent optimization program 110a, 110b may also receive data from speech (e.g., tone, inflection and voice), facial expression and other forms of non-textual data generated by the customer to extract the personality traits of the customer, as well as data derived from previous customer interactions with human agents and agent interactions with other customers who possess similar personality traits to the specific customer in this particular interaction. The received data may be entered into a known external extraction engine to extract the personality traits of the customer and virtual agent.

For example, a customer is on the customer's personal mobile device and looking for home apparel on a company's website. The customer frequently visits the website for various products ranging from office supplies to home appliances. Each time the customer is on the website, the customer is contacted by a virtual agent. Therefore, the personality-based virtual agent optimization program 110a, 110b receives data on the customer from the previous dialogs between the customer and virtual agents on the website. The personality-based virtual agent optimization program 110a, 110b inputs the data from the previous dialogs into an external extraction engine.

Next, at 204, the personality traits of the customer and agent are extracted using an external extraction engine. The external extraction engine may analyze the data generated by the customer and virtual agent, and may extract the personality features of the customer and virtual agent based on the data entered into the external extraction engine. Continuing the previous example, the external extraction engine analyzes the received data from the previous dialogs between the customer and other virtual agents on the website. From the received data, the external extraction engine extracts the personality features of the customer and virtual agent in the current interaction. The customer's personality traits include professional and introversive, and the virtual agent's personality traits include openness, agreeableness and informal.

Then, at 206, the customer satisfaction label is determined by utilizing human intervention to train the customer satisfaction prediction model. A label is a binary flag that states whether the conversation ended with a positive or negative customer satisfaction. At least one person may be used to read the conversations initially entered to build the customer satisfaction prediction model and to determine whether the customer was satisfied at the end of the interaction between the customer and virtual agent. Until the customer satisfaction prediction model may perform with accuracy and reliability without human intervention, the human intervention may be useful in building the customer satisfaction prediction model. The customer satisfaction prediction model may be iterative and may improve throughout the training process. Each customer-virtual agent conversation may be given a label, which may indicate whether the customer was satisfied or dissatisfied with the interaction. Additionally, the customer satisfaction label may be determined based on whether the customer purchased any goods or services from the website that utilized the virtual agent, or through customer feedback after the interaction.

Continuing the previous example, a person reviews a record of recent conversation between the customer and the virtual agent, and determines that the customer was dissatisfied with the current virtual agent interaction.

Then, at 208, features are extracted from each interaction between the customer and virtual agent, or the first interaction with the customer. The data generated may be entered into known classifiers to extract features related to personality traits, emotions (i.e., emotion expressed in the content of the data) and the text (i.e., extracted from content of previous conversations). The extracted features may include the word choices and phrases of the customer and the virtual agent, any indication of the customer's emotional state, and the determined personality traits of the customer and the virtual agent. These features may be utilized to build the customer satisfaction prediction model to predict customer satisfaction through the machine learning process. Therefore, the optimal agent personality traits may be calculated before the assignment of the agent.

An output of the generated data may be a trained customer satisfaction prediction model 210, which calculates a customer satisfaction score as an output. The previously received data may include the extracted features, the personality traits of the customer and virtual agent, and the customer satisfaction determination that are then entered into a known optimization solver to determine the parameters that yield the best function for predicting the satisfaction of the customer. The best function may be the function with the lowest error for predicting customer satisfaction for the training data. After the data is analyzed by the optimization solver, a known external engine may generate the numeric parameters for each of the personality traits for the virtual agent. The optimization process may enhance the accuracy of the customer predictions generated after training the customer satisfaction prediction model 210. Then, known algorithms may be utilized to build the customer satisfaction prediction model 210 that predicts the customer satisfaction score. A customer satisfaction score, which determines whether the customer was satisfied or dissatisfied with the interaction, may range from 0 to 1, with 0 indicating that the customer was dissatisfied, and 1 indicating that the customer was satisfied with the interaction.

Continuing the previous example, the personality-based virtual agent optimization program 110a, 110b enters data generated from the current conversation into the classifiers to extract features from the conversation. From the customer, the extracted features include the consistent use of complete sentences, use of formal tense of words used (i.e., lack of use of colloquialisms), repeated comments indicating the virtual agent's assistance was unhelpful, and abrupt end to the interaction. From the virtual agent, the extracted features include the consistent use of phrases "thank you" and "please," use of informal phrases or words, and repeated use of explanation marks, emojis and emoticons. The personality traits of the customer include secretive and introversive, and the personality traits of the virtual agent include openness, extroversive and agreeableness. The customer satisfaction determination is that the customer was dissatisfied with the interaction with the virtual agent. The received data is analyzed by the optimization solver. An external engine, then, generates the following numeric parameters for each of the personality traits for the optimal virtual agent: Openness=0.3; Conscientiousness=0.6; Extraversion=0.49; Agreeableness=0.7; and Neuroticism=0.4. The parameters are entered into the following function:

$$D(\ldots, f^c, f^a, \theta, \ldots) = \theta_1 \cdot f^c + \theta_2 \cdot f^a + \theta_3 \cdot (f^a - f^c)^2 + \ldots$$

In the above algorithm, $f^c$ represents the numeric value for personality traits for the customer, and $f^a$ represents the numeric value for the personality traits for the virtual agent. The $\theta$ value represents the parameters that may yield minimal error in the calculation of the customer satisfaction score as determined by the optimization solver. The customer satisfaction prediction model 210 learns that the personality trait values of this virtual agent may not maximize customer satisfaction of the specific customer or another customer with similar personality traits. Once the customer satisfaction prediction model 210 is trained, the customer satisfaction prediction model 210 may generate a customer satisfaction score. For this example, the resulting customer satisfaction score would be 0.4 since the customer was dissatisfied with the virtual agent.

Figure 3:
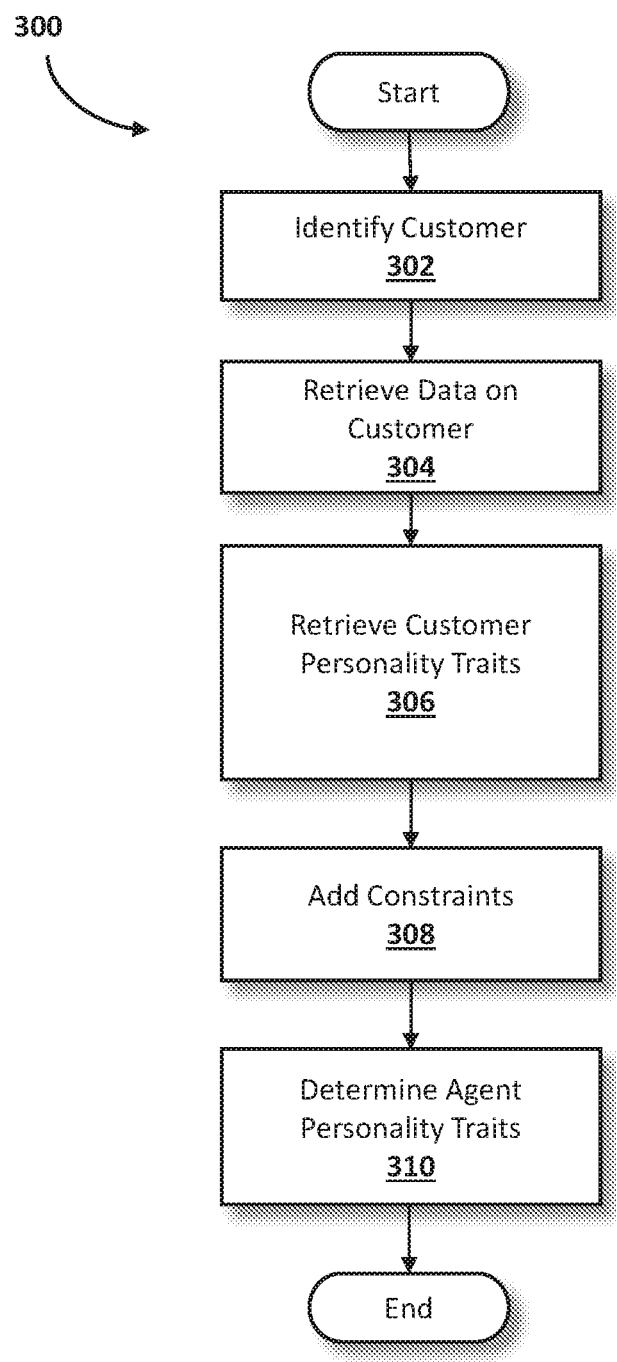
FIG. 3 is an operational flowchart illustrating a process for optimizing virtual agent personality trait levels according to at least one embodiment.

Referring now to FIG. 3, an operational flowchart illustrating the exemplary process for optimizing virtual agent personality trait levels 300 used by the personality-based virtual agent optimization program 110a and 110b according to at least one embodiment is depicted.

At 302, the personality-based virtual agent optimization program 110a, 110b identifies the customer. The personality-based virtual agent optimization program 110a, 110b may recognize that a person has logged into the client computer 102 and may associate the customer with the person who logged into the client computer 102. For example, since the person is logged into the customer's personal computer to search a company's website, the customer is determined to be the person.

Next, at 304, the personality-based virtual agent optimization program 110a, 110b retrieves data related to the customer. A virtual agent (i.e., chatbot) may appear on the screen to initiate communication with the customer and to determine the appropriate type of customer assistance. During the interaction, data on the customer may be retrieved from historical social media dialogs and previous interactions with a virtual agent on the current website. Alternatively, the personality-based virtual agent optimization program 110a, 110b may also utilize a questionnaire, emails and other forms of communication (e.g., facial expression and speech) to determine the personality traits of the customer. Textual communication may be uploaded into the personality-based virtual agent optimization program 110a, 110b as data relating to the customer. The data retrieved relating to the customer may be entered into the customer satisfaction prediction model 210 to determine the optimal personality traits of the virtual agent.

Continuing the previous example, the virtual agent initiates the virtual chat and asks the customer how the virtual agent may assist the customer. The customer quickly responds and explains the customer is looking for sales on vacation packages during the last two weeks of the year. The customer further thanks the virtual agent in advance for any assistance that the virtual agent may provide. In response, the virtual agent provides a list of possible destinations, and the customer exchanges additional questions with the virtual agent. The personality-based virtual agent optimization program 110a, 110b retrieves data from historical social media dialogs in which the customer frequently uses colloquialisms, and is generally cooperative. During the interaction, the customer used colloquial words and phrases, and consistently used the phrases "thank you" and "please" while interacting with the virtual agent. The record of the interaction may also be retrieved for analysis by the customer satisfaction prediction model 210.

Then, at 306, the customer personality traits are retrieved from the customer satisfaction prediction model 210. The data retrieved on the customer may be entered into the customer satisfaction prediction model 210. The customer satisfaction prediction model 210 may predict the label (e.g., binary flag on whether the customer was dissatisfied or satisfied with the former interactions) and calculate the customer satisfaction score, ranging from 0 to 1, utilizing a known algorithm. The customer satisfaction prediction model 210 may calculate a score for each customer, which may be utilized to determine the personality traits of the optimal virtual agent, based on the previous historical dialogs and former interactions with previous virtual agents. The customer satisfaction prediction model 210 may be optimized with respect to the personality traits of the agent to determine the traits that would maximize the customer's satisfaction. Additionally, the customer satisfaction prediction model 210 may utilize the external extraction engine to extract the personality traits of the customer based on the retrieved data. However, the customer satisfaction score, the label and the personality traits of the customer may be insufficient to generate the optimal virtual agent for the customer, therefore a default virtual agent may be generated to handle the basic inquiry of the customer. Even though the default virtual agent may assist the customer, the optimal virtual agent may provide a better customer experience based on the personality traits of the customer.

Continuing the previous example, the customer satisfaction prediction model 210 calculates a score of 0.7 for the specific customer, and determines that the customer is mostly satisfied with the previous virtual agent interactions on the current website. The customer satisfaction prediction model 210 runs the data retrieved related to the customer through the external extraction engine, which extracts the personality traits of the customer. The determined personality traits of the customer are openness, agreeableness and informal.

Then, at 308, the personality-based virtual agent optimization program 110a, 110b adds constraints on the personality traits of the virtual agent. To create the optimal virtual agent based on customer satisfaction, the personality-based virtual agent optimization program 110a, 110b may apply constraints on certain pre-defined personality traits associated with the virtual agent since a full spectrum of personality traits may not be optimal during a specific customer and virtual agent interaction. Therefore, the personality-based virtual agent optimization program 110a, 110b may select a specific range of pre-defined personality traits for the virtual agent. The personality-based virtual agent optimization program 110a, 110b may utilize a known algorithm (i.e., function on constraints) for the specific range of personality traits for the virtual agent, which may determine the maximum customer satisfaction and generate data to create the optimal virtual agent. The generated function on constraints may map the personality traits of the customer and the optimal virtual agent to estimate the customer satisfaction.

Continuing the previous example, the personality-based virtual agent optimization program 110a, 110b utilizes the following algorithm for the specific range of this personality trait for the agent:

$$0.6 \leq f_1^a \leq 0.8; \Sigma_{i=1}^{m} |f_i^a| < \alpha$$

The algorithm includes the specific range of 0.6 to 0.8 for the level of extraversion that the optimal virtual agent should express during the interaction with the customer. Therefore, any optimal virtual agent that is generated for this interaction with the customer may be included in this specific range to maximize the satisfaction of the customer. The generated function on constraints is utilized to determine a plethora of pre-defined personality traits that may be exhibited by the optimal virtual agent.

Then, at 310, the personality trait values of the optimal virtual agent are determined. The personality trait values of the agent may affect the customer's degree of satisfaction. The personality-based virtual agent optimization program 110a, 110b may change the personality traits of the agent iteratively to increase the customer satisfaction. To determine the maximum customer satisfaction, the personality-based virtual agent optimization program 110a, 110b may determine the personality traits for the optimal virtual agent by utilizing a known constrained optimization solver. The personality traits values for the customer, the constraints on the personality trait values of the virtual agent, and the function generated at 308 are fed as input into the constrained optimization solver. The output of the constrained optimization solver may be a list of the personality traits with the appropriate levels ranging from 0 to 1 for each personality trait that the optimal virtual agent may possess to maximize the satisfaction of the customer. The output of the constrained optimization solver may be the set of personality trait values for the agent that may create the optimal agent for this interaction with the customer.

Continuing the previous example, the personality traits of the customer, the generated constraints on the personality traits of the virtual agent, and the function generated at 308 are entered into the constrained optimization solver to determine the personality traits for the optimal virtual agent for the current interaction with the customer. Based on the optimization process, the personality traits of the optimal virtual agent for this interaction with this given customer should be as follows: Openness=0.6; Conscientiousness=0.81; Extraversion=0.63; Agreeableness=0.86; and Neuroticism=0.25.

In the present embodiment, the process of inputting the generated data and creating the optimal virtual agent may be performed by another known program to continue the customer interaction. Depending on the other program used, the data generated from the personality-based virtual agent optimization program 110a, 110b may be utilized to generate data to continue the virtual chat with the customer.

In the present embodiment, the customer may provide feedback regarding the interaction with the virtual agent. At the conclusion of the interaction, the customer may be prompted (e.g., via a dialog box) to provide customer feedback. At such point, the customer may provide a detailed explanation describing why the customer was satisfied or dissatisfied with the virtual agent interaction. Such feedback may affect the customer satisfaction label generated for this specific interaction and future interactions with the virtual agent and the customer.

In the present embodiment, the interaction between the customer and the optimal virtual agent generated by the other program, which creates the optimal virtual agent and continues the virtual chat with the customer, may become a part of the record of recent conversations generated by the personality-based virtual agent optimization program 110a, 110b. As such, the interaction may be utilized by the personality-based virtual agent optimization program 110a, 110b as input data for future interactions between the customer and future virtual agents. Therefore, more data may be generated to create future optimal virtual agents.

In the present embodiment, the generated data and the customer satisfaction prediction model 210 may be utilized to determine an appropriate human agent to interact with the customer on social media channels. Therefore, the personality-based virtual agent optimization program 110a, 110b may be utilized to determine the appropriate human agent, if the data is available.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
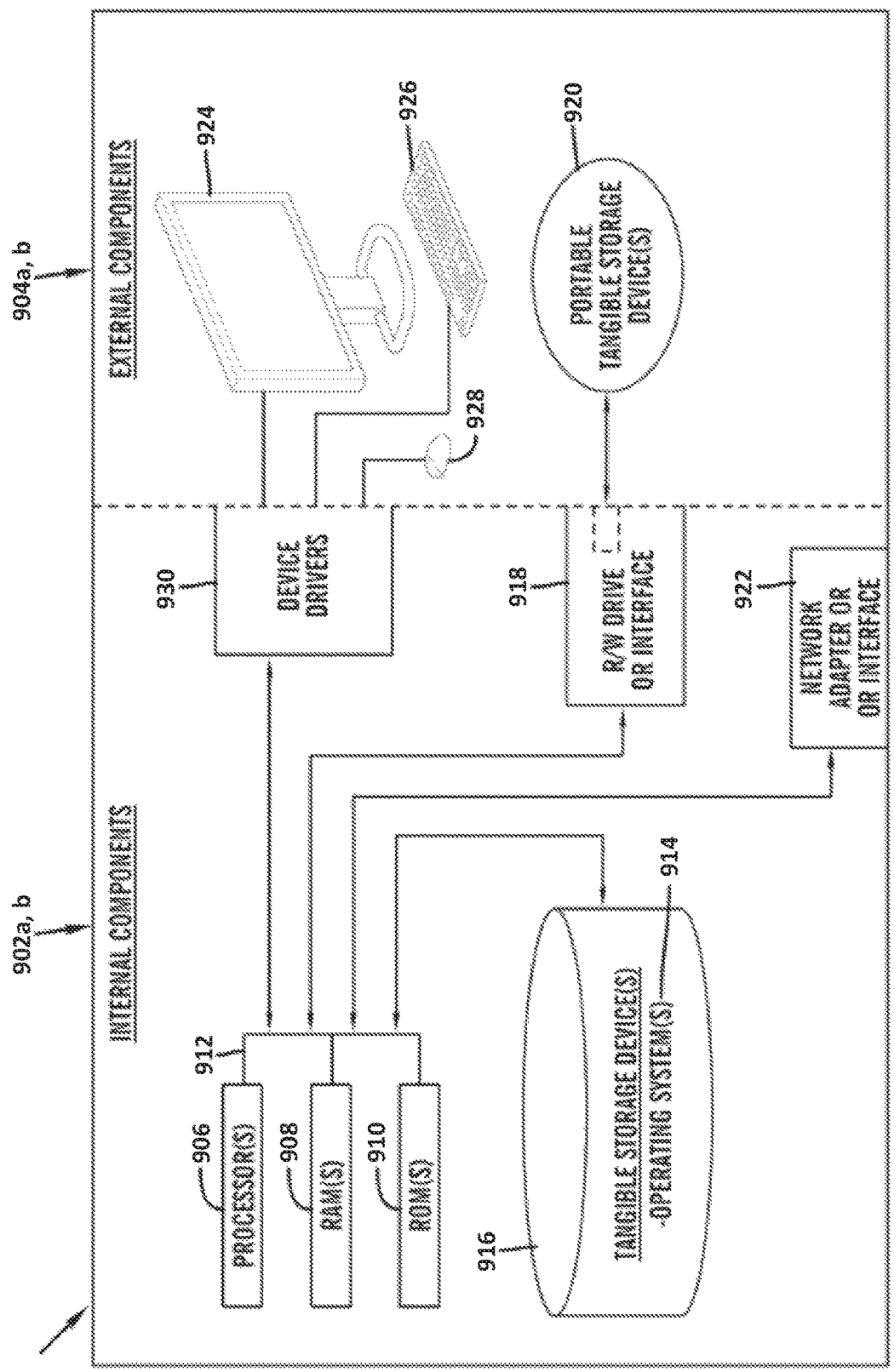
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the personality-based virtual agent optimization program 110a in client computer 102, and the personality-based virtual agent optimization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the personality-based virtual agent optimization program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the personality-based virtual agent optimization program 110a in client computer 102 and the personality-based virtual agent optimization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the personality-based virtual agent optimization program 110a in client computer 102 and the personality-based virtual agent optimization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
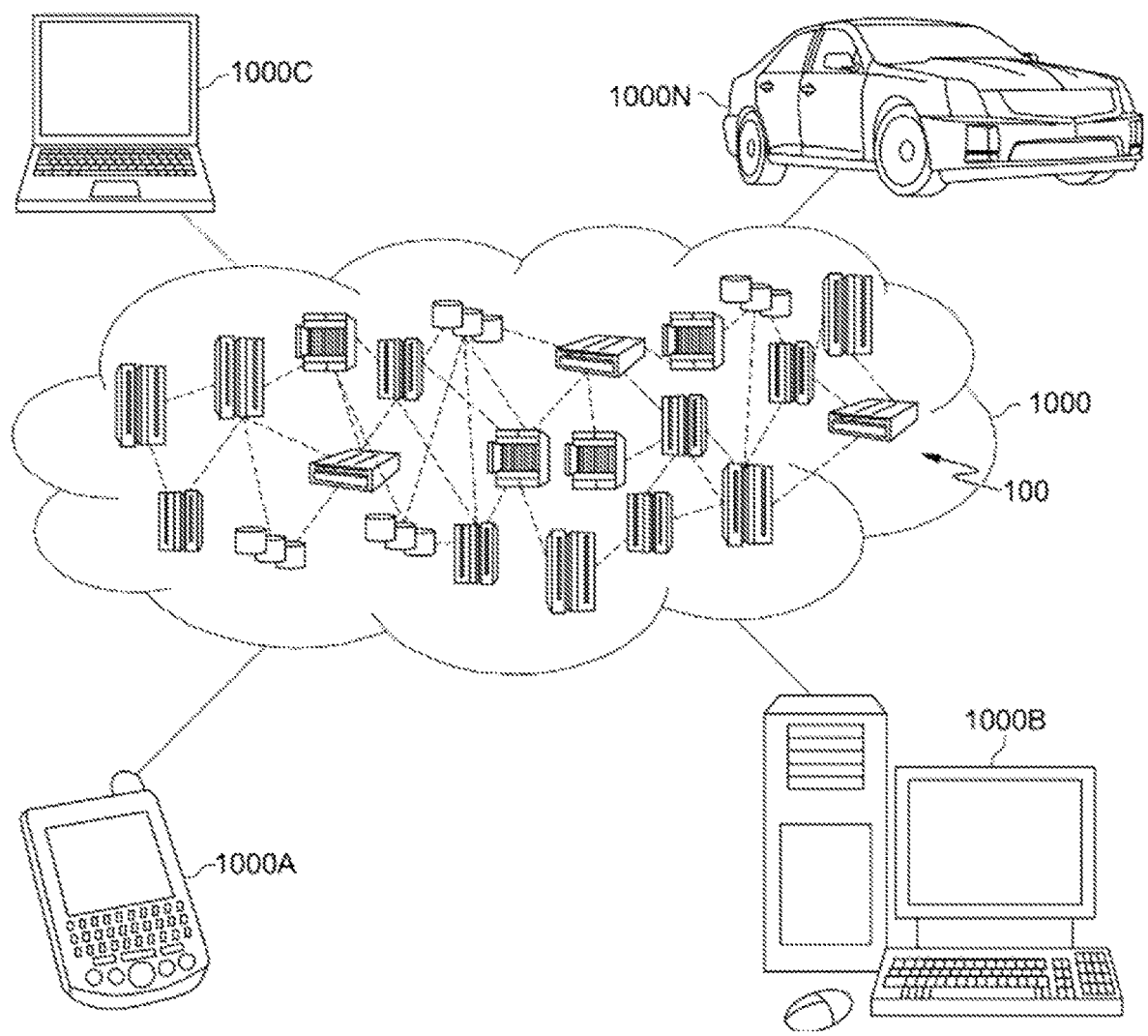
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
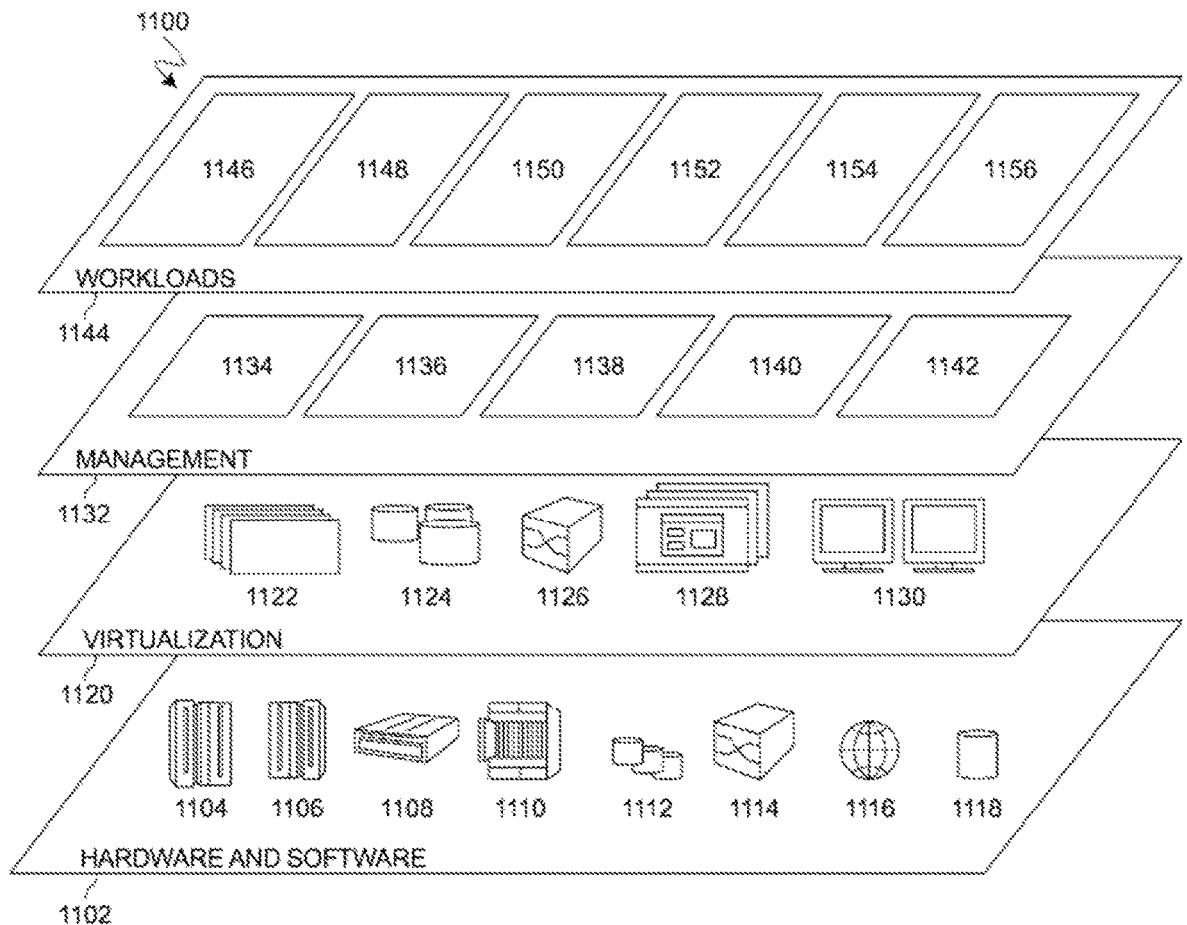
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and personality-based virtual agent optimization 1156. A personality-based virtual agent optimization program 110a, 110b provides a way to optimize the personality trait levels of virtual agents based on predicted customer satisfaction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing a plurality of personality traits of a virtual agent based on a predicted customer satisfaction value, the method comprising:

identifying a customer utilizing a customer support service;

retrieving a plurality of data associated with the customer;

analyzing the received plurality of data using a customer satisfaction prediction model, the customer satisfaction prediction model being configured as a function to predict whether a dialog between a virtual agent and the customer results in a positive customer satisfaction result, the customer satisfaction prediction model trained on historical dialogs tagged with a binary label indicative of whether each of the historical dialogs ended in the positive customer satisfaction result;

generating a plurality of analyzed data from the customer satisfaction prediction model based on the analyzed plurality of data; and generating a plurality of personality traits for a virtual agent from the generated plurality of analyzed data, the personality traits configured to modify default personality traits of the virtual agent, wherein each of the personality traits respectively corresponds to a type of personality trait, the types of personality traits being defined as respective ranges, the personality traits being generated through a respective upper limit constraint and lower limit constraint applied to each of the respective ranges, the upper and lower limit constraints being based on the generated plurality of analyzed data, the personality traits being further generated through an overall distribution constraint limiting a sum of the plurality of the personality traits, wherein the personality traits for the virtual agent compliment further personality traits of the customer to improve a customer satisfaction score during an interaction between the virtual agent and the customer, wherein the virtual agent is assigned to the customer conditional on the personality traits to be expressed by the virtual agent.

2. The method of claim 1, wherein generating a plurality of analyzed data from the customer satisfaction prediction model based on the analyzed plurality of data, further comprises:

generating the customer satisfaction score based on the analyzed plurality of data; and generating a label based on the analyzed plurality of data.

3. The method of claim 2, further comprising:

extracting a plurality of personality traits associated with the customer based on the analyzed plurality of data using an external extraction engine; and generating a plurality of personality traits for the virtual agent from the generated customer satisfaction score, the generated label and the extracted plurality of personality traits associated with the customer.

4. The method of claim 3, further comprising:

generating a function on constraints for the generated plurality of personality traits associated with the virtual agent;

analyzing the constraints, the generated function on constraints and the extracted plurality of personality traits associated with the customer using a constrained optimization solver;

generating the plurality of personality traits for the virtual agent based on the analyzed plurality of constraints, the analyzed function on constraints and the analyzed plurality of personality traits for the customer; and presenting the generated plurality of personality traits for the virtual agent to a user.

5. The method of claim 1, further comprising:

retrieving a plurality of training data associated with the customer; and extracting a plurality of training personality traits for the virtual agent and a plurality of training personality traits for the customer based on the retrieved plurality of training data using an external extraction engine.

6. The method of claim 5, further comprising:

determining a training label for a customer satisfaction based on the retrieved plurality of training data;

extracting a plurality of features from the retrieved plurality of training data using a plurality of classifiers; and analyzing the determined training label, the extracted plurality of features and the extracted plurality of training personality traits associated with the virtual agent using an optimization solver.

7. The method of claim 5, further comprising:

determining a training label for the customer satisfaction based on the retrieved plurality of training data;

extracting a plurality of features from the retrieved plurality of training data using a plurality of classifiers; and analyzing the determined training label, the extracted plurality of features and the extracted plurality of training personality traits associated with the customer using the optimization solver.

8. The method of claim 7, further comprising:

training a customer satisfaction prediction model from the analyzed training label, the analyzed plurality of features, the analyzed plurality of training personality traits of the virtual agent, and the analyzed plurality of training personality traits of the customer.

9. A computer system for optimizing a plurality of personality traits of a virtual agent based on a predicted customer satisfaction value, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying a customer utilizing a customer support service;

retrieving a plurality of data associated with the customer;

analyzing the received plurality of data using a customer satisfaction prediction model, the customer satisfaction prediction model being configured as a function to predict whether a dialog between a virtual agent and the customer results in a positive customer satisfaction result, the customer satisfaction prediction model trained on historical dialogs tagged with a binary label indicative of whether each of the historical dialogs ended in the positive customer satisfaction result;

generating a plurality of analyzed data from the customer satisfaction prediction model based on the analyzed plurality of data; and generating a plurality of personality traits for a virtual agent from the generated plurality of analyzed data, the personality traits configured to modify default personality traits of the virtual agent, wherein each of the personality traits respectively corresponds to a type of personality trait, the types of personality traits being defined as respective ranges, the personality traits being generated through a respective upper limit constraint and lower limit constraint applied to each of the respective ranges, the upper and lower limit constraints being based on the generated plurality of analyzed data, the personality traits being further generated through an overall distribution constraint limiting a sum of the plurality of the personality traits, wherein the personality traits for the virtual agent compliment further personality traits of the customer to improve a customer satisfaction score during a communication between the virtual agent and the customer, wherein the virtual agent is assigned to the customer conditional on the personality traits to be expressed by the virtual agent.

10. The computer system of claim 9, wherein generating a plurality of analyzed data from the customer satisfaction prediction model based on the analyzed plurality of data, further comprises:
generating the customer satisfaction score based on the analyzed plurality of data; and
generating a label based on the analyzed plurality of data.

11. The computer system of claim 10, further comprising:
extracting a plurality of personality traits associated with the customer based on the analyzed plurality of data using an external extraction engine; and
generating a plurality of personality traits for the virtual agent from the generated customer satisfaction score, the generated label and the extracted plurality of personality traits associated with the customer.

12. The computer system of claim 11, further comprising:
generating a function on constraints for the generated plurality of personality traits associated with the virtual agent;
analyzing the constraints, the generated function on constraints and the extracted plurality of personality traits associated with the customer using a constrained optimization solver;
generating the plurality of personality traits for the virtual agent based on the analyzed plurality of constraints, the analyzed function on constraints and the analyzed plurality of personality traits for the customer; and
presenting the generated plurality of personality traits for the virtual agent to a user.

13. The computer system of claim 9, further comprising:
retrieving a plurality of training data associated with the customer; and
extracting a plurality of training personality traits for the virtual agent and a plurality of training personality traits for the customer based on the retrieved plurality of training data using an external extraction engine.

14. The computer system of claim 13, further comprising:
determining a training label for a customer satisfaction based on the retrieved plurality of training data;
extracting a plurality of features from the retrieved plurality of training data using a plurality of classifiers; and
analyzing the determined training label, the extracted plurality of features and the extracted plurality of training personality traits associated with the virtual agent using an optimization solver.

15. The computer system of claim 13, further comprising:
determining a training label for the customer satisfaction based on the retrieved plurality of training data;
extracting a plurality of features from the retrieved plurality of training data using a plurality of classifiers; and
analyzing the determined training label, the extracted plurality of features and the extracted plurality of training personality traits associated with the customer using the optimization solver.

16. The computer system of claim 15, further comprising:
training a customer satisfaction prediction model from the analyzed training label, the analyzed plurality of features, the analyzed plurality of training personality traits of the virtual agent, and the analyzed plurality of training personality traits of the customer.

17. A computer program product for optimizing a plurality of personality traits of a virtual agent based on a predicted customer satisfaction value, comprising:
one or more computer-readable storage medium and program instructions stored on at least one of the one or more tangible storage medium, the program instructions executable by a processor, the program instructions comprising:
program instructions to identify a customer utilizing a customer support service;
program instructions to retrieve a plurality of data associated with the customer;
program instructions to analyze the received plurality of data using a customer satisfaction prediction model, the customer satisfaction prediction model being configured as a function to predict whether a dialog between a virtual agent and the customer results in a positive customer satisfaction result, the customer satisfaction prediction model trained on historical dialogs tagged with a binary label indicative of whether each of the historical dialogs ended in the positive customer satisfaction result;
program instructions to generate a plurality of analyzed data from the customer satisfaction prediction model based on the analyzed plurality of data; and
program instructions to generate a plurality of personality traits for a virtual agent from the generated plurality of analyzed data, the personality traits configured to modify default personality traits of the virtual agent, wherein each of the personality traits respectively corresponds to a type of personality trait, the types of personality traits being defined as respective ranges, the personality traits being generated through a respective upper limit constraint and lower limit constraint applied to each of the respective ranges, the upper and lower limit constraints being based on the generated plurality of analyzed data, the personality traits being further generated through an overall distribution constraint limiting a sum of the plurality of the personality traits,
wherein the personality traits for the virtual agent compliment further personality traits of the customer to improve a customer satisfaction score during a communication between the virtual agent and the customer,
wherein the virtual agent is assigned to the customer conditional on the personality traits to be expressed by the virtual agent.

18. The computer program product of claim 17, wherein program instructions to generate a plurality of analyzed data from the customer satisfaction prediction model based on the analyzed plurality of data, further comprises:
program instructions to generate the customer satisfaction score based on the analyzed plurality of data; and
program instructions to generate a label based on the analyzed plurality of data.

19. The computer program product of claim 18, further comprising:
program instructions to extract a plurality of personality traits associated with the customer based on the analyzed plurality of data using an external extraction engine; and
program instructions to generate a plurality of personality traits for the virtual agent from the generated customer satisfaction score, the generated label and the extracted plurality of personality traits associated with the customer.

20. The computer program product of claim 19, further comprising:

program instructions to generate a function on constraints for the generated plurality of personality traits associated with the virtual agent;

program instructions to analyze the constraints, the generated function on constraints and the extracted plurality of personality traits associated with the customer using a constrained optimization solver;

program instructions to generate the plurality of personality traits for the virtual agent based on the analyzed plurality of constraints, the analyzed function on constraints and the analyzed plurality of personality traits for the customer; and program instructions to present the generated plurality of personality traits for the virtual agent to a user.

* * * * *